(12) United States Patent
Shin

(10) Patent No.: US 10,599,452 B2
(45) Date of Patent: Mar. 24, 2020

(54) SERVICE REQUEST SYSTEM AND METHOD USING SERVICE REQUEST DEVICE FOR MULTIPLE LANGUAGE SUPPORTED ROOM

(71) Applicant: Mediazen, Inc., Seongnam-si Gyeonggi-do (KR)

(72) Inventor: Ji Hoon Shin, Seoul (KR)

(73) Assignee: MEDIAZEN, INC., Seongnam-si, Gyeonggi-do (KR)

( * ) Notice: Subject to any disclaimer, the term of this patent is extended or adjusted under 35 U.S.C. 154(b) by 0 days.

(21) Appl. No.: 15/758,403

(22) PCT Filed: Sep. 7, 2017

(86) PCT No.: PCT/KR2017/009833
§ 371 (c)(1),
(2) Date: Mar. 8, 2018

(87) PCT Pub. No.: WO2018/070669
PCT Pub. Date: Apr. 19, 2018

(65) Prior Publication Data
US 2019/0042285 A1 Feb. 7, 2019

(30) Foreign Application Priority Data
Oct. 11, 2016 (KR) .................... 10-2016-0131106

(51) Int. Cl.
*G06F 17/20* (2006.01)
*G06F 9/451* (2018.01)
(Continued)

(52) U.S. Cl.
CPC ............. *G06F 9/454* (2018.02); *G06F 3/167* (2013.01); *G06F 11/328* (2013.01); *G06F 16/61* (2019.01);
(Continued)

(58) Field of Classification Search
CPC .......... G06F 9/454; G06F 17/28; G06F 16/61; G06F 3/167; G06F 11/328; G06F 9/453;
(Continued)

(56) References Cited

U.S. PATENT DOCUMENTS

2009/0076934 A1* 3/2009 Shahbazi ............. G06Q 20/102 705/30
2010/0250707 A1* 9/2010 Dalley ................... G06Q 10/10 709/219
2015/0058253 A1 2/2015 Cho

FOREIGN PATENT DOCUMENTS

KR 10-2006-0008053 A 1/2006
KR 10-2008-0000381 A 1/2008
(Continued)

*Primary Examiner* — Thierry L Pham
(74) *Attorney, Agent, or Firm* — Rabin & Berdo, P.C.

(57) ABSTRACT

Disclosed are a service request system and method using a service request device for a multiple language supported room, more particularly, a service request system and method using a service request device for a multiple language supported room, for allowing a user to make a request for a service selected by the user in the room in a language selected by the user. Here, an efficient operating process is provided by making a request for a service selected by a user in a room in a language selected by the user to remove a language barrier and to differentiate and call a service desired by a user according to an accurate intention, a service is immediately processed by calling a service to a corresponding employee when a service is called through a service request system, and convenience of a service is provided to allow a user to easily recognize a processing result when the service is requested.

34 Claims, 4 Drawing Sheets

(51) Int. Cl.

| | | |
|---|---|---|
| *H04L 12/18* | (2006.01) | |
| *G06F 3/16* | (2006.01) | |
| *G10L 15/22* | (2006.01) | |
| *G10L 15/02* | (2006.01) | |
| *G06Q 50/12* | (2012.01) | |
| *G06F 11/32* | (2006.01) | |
| *G06F 16/61* | (2019.01) | |
| *G06Q 30/02* | (2012.01) | |
| *H04L 12/58* | (2006.01) | |
| *G06F 17/27* | (2006.01) | |
| *H04L 29/08* | (2006.01) | |
| *H04W 4/12* | (2009.01) | |
| *H04W 4/50* | (2018.01) | |

(52) U.S. Cl.
CPC ......... *G06Q 30/0281* (2013.01); *G06Q 50/12* (2013.01); *G10L 15/02* (2013.01); *G10L 15/22* (2013.01); *H04L 12/189* (2013.01); *H04L 12/1859* (2013.01); *H04L 12/1895* (2013.01); *H04L 51/063* (2013.01); *G06F 9/453* (2018.02); *H04L 67/32* (2013.01); *H04W 4/12* (2013.01); *H04W 4/50* (2018.02)

(58) Field of Classification Search
CPC ......... H04W 4/12; G06Q 50/10; G06Q 50/12; H04L 12/1859; H04L 12/189; H04L 12/1895; G10L 15/02; G10L 15/22
USPC .......................................................... 704/8
See application file for complete search history.

(56) References Cited

FOREIGN PATENT DOCUMENTS

| | | |
|---|---|---|
| KR | 10-2010-0133533 A | 12/2010 |
| KR | 10-1482906 B1 | 1/2015 |
| KR | 10-2015-0024069 A | 3/2015 |

* cited by examiner

SERVICE REQUEST SYSTEM AND METHOD USING SERVICE REQUEST DEVICE FOR MULTIPLE LANGUAGE SUPPORTED ROOM

TECHNICAL FIELD

The present invention relates to a service request system and method using a service request device for a multiple language supported room, and more particularly, to a service request system and method using a service request device for a multiple language supported room, for making a request for a service selected by a user in a room in a language selected by the user.

BACKGROUND ART

In general, to efficiently manage a hotel and to provide high-quality service, the hotel is maintained with objectives to develop a clean and pleasant environment and to serve guest needs.

Among the objectives, to serve guest needs, a hotel manager visits a room in response to a guest call or receives a service request by wire and provides a corresponding service. However, although hotel guests need to use a common language, English, a guest who cannot speak English has difficulty in communication for a service request. Accordingly, problems arise in that a service provided by a hotel does not meet a service requested by a guest or a different service from the guest request is provided.

To avert these problems, the present invention proposes a technology for inputting information on a guest request via a service button, selecting a language, and audibly providing the information input via the service button using the language selected by the guest to enable the guest to accurately make a request for a service and to enable a hotel that receives the service request to accurately provide the service requested by the guest.

DISCLOSURE

Technical Problem

An object of the present invention is to provide an efficient operating process by making a request for a service selected by a user in a room in a language selected by the user to remove a language barrier and to differentiate and call a service desired by a user according to an accurate intention.

An object of the present invention is to immediately process a service by calling a service to a corresponding employee when a service is called through a service request system.

An object of the present invention is to provide convenience of a service to allow a user to easily recognize a processing result when the service is requested.

Technical Solution

The object of the present invention can be achieved by providing a service request system for a multiple language supported room, including:

a service request device 100 installed in a room and configured to, in response to a desired language and service being selected by a user and a request for a specific service being made, notify the user about information on the selected service using the language selected by the user, to generate service request information corresponding to the service requested by the user, to transmit the generated service request information to a monitoring system 200, to receive service processing state information of the requested service from the monitoring system 200, and to display a processing result of the requested service through a request result display 160;

the monitoring system 200 configured to transmit the service request information transmitted from the service request device 100 to an employee terminal 300, and to generate the service processing state information of the requested service based on service processing result information indicating that processing of the requested service is scheduled or completed and to transmit the service processing state information to the service request device 100, in response to the service processing result information being received from a specific employee terminal 300; and a plurality of employee terminals 300 configured to receive the service request information from the monitoring system 200 and including an application installed therein to perform a function of generating service processing result information on a service request corresponding to the received service request information and transmitting the service processing result information to the monitoring system 200.

In another aspect of the present invention, provided herein is a service request system for a multiple language supported room, including:

a language selection unit 110 formed to enable a user to select a desired language;

a service button unit 130 including a plurality of service buttons with a specific service being set for each button;

a button selection controller 132 configured to determine whether any one of the service buttons included in the service button unit 130 is selected by the user for a predetermined time period or according to a predetermined rule and configured to generate button selection information and to transmit the button selection information to a voice output controller 140 upon determining that any one of the service buttons is selected for the predetermined time period;

the voice output controller 140 configured to determine that a specific service button of the service button unit 130 is selected by the user upon receiving the button selection information from the button selection controller 132, configured to identify the selected service button using the button selection information, configured to extract voice data in the language selected through the language selection unit 110 among voice data corresponding to service content set to the selected service button, from a voice data memory 180, and configured to control a speaker unit 150 to output the voice data;

the speaker unit 150 configured to output the voice data extracted by the voice output controller 140 under control of the voice output controller 140;

a request result display 160 configured to display service processing state information indicating a current processing situation of the service requested by the user;

a request information generation unit 170 configured to generate service request information indicating information on the service that is selected and requested by the user through the service button unit 130;

the voice data memory 180 configured to store voice data for each language corresponding to the service content set for each of the plurality of service buttons included in the service button unit 130; and a communication unit 185 connected to a monitoring system 200 via wireless network communication and configured to transmit service request information to the monitoring system 200 or to receive processing state information from the monitoring system 200.

In another aspect of the present invention, provided herein is a service request method for a multiple language supported room, the method including:

language/service input of receiving selection of a language and service that is desired by a user, through a service request device 100;

service content of guiding language and service content input by the user, through the service request device;

service request information generation of generating service request information related to the service selected by the user, through the service request device 100;

service request information transmission of transmitting service request information generated by the service request device 100 to the monitoring system 200;

second service request information transmission of determining an employee who is capable of processing the requested service related to the service request information and transmitting the service request information to the employee terminal 300 of the determined employee, through the monitoring system 200;

service processing result information generation of generating service processing result information indicating a processing result of a service related to the service request information, through the employee terminal 300;

service processing result information transmission of transmitting the generated service processing result information to the monitoring system 200, through the employee terminal 300;

service processing state information generation of generating service processing state information using the service processing result information, through the monitoring system 200;

service processing state information transmission of transmitting the service processing state information to the service request device 100, through the monitoring system 200; and service processing state display of displaying a processing state of the service requested by the user using a display unit based on service processing state information, through the service request device 100.

Advantageous Effects

According to the present invention, a language to be used by a user may be selected and a service may be used through a service for supporting multiple languages to provide convenience of service usage and to reduce hotel operating costs.

A type of a service requested by a user may be prespecified and requested to shorten a hotel operating process.

In addition, a type of a service request of a user may be extended to enhance industrial applicability.

EXPLANATION OF REFERENCE NUMERALS

| | |
|---|---|
| 100: service request device | |
| 110: language selection unit | 120: display unit |
| 121: text output controller | 122: text data memory |
| 130: service button unit | 131: additional service button |
| 132: button selection controller | 140: button selection controller |
| 150: speaker unit | 160: request result display |
| 161: lighting unit | 170: request information generation unit |
| 180: voice data memory | 185: communication unit |
| 190: user mobile phone identification unit | 195: removal prevention unit |
| 200: monitoring system | |
| 210: information receiver | 220: request information processor |
| 230: processing state information generation unit | 240: information transmitter |
| 250: user identification processor | 260: user information DB |
| 300: employee terminal | |
| 400: function setting system | |
| 500: multiple language voice data DB | |

BEST MODE

Hereinafter, the present invention will be described in detail by explaining exemplary embodiments of the invention with reference to the attached drawings.

Figure 1:
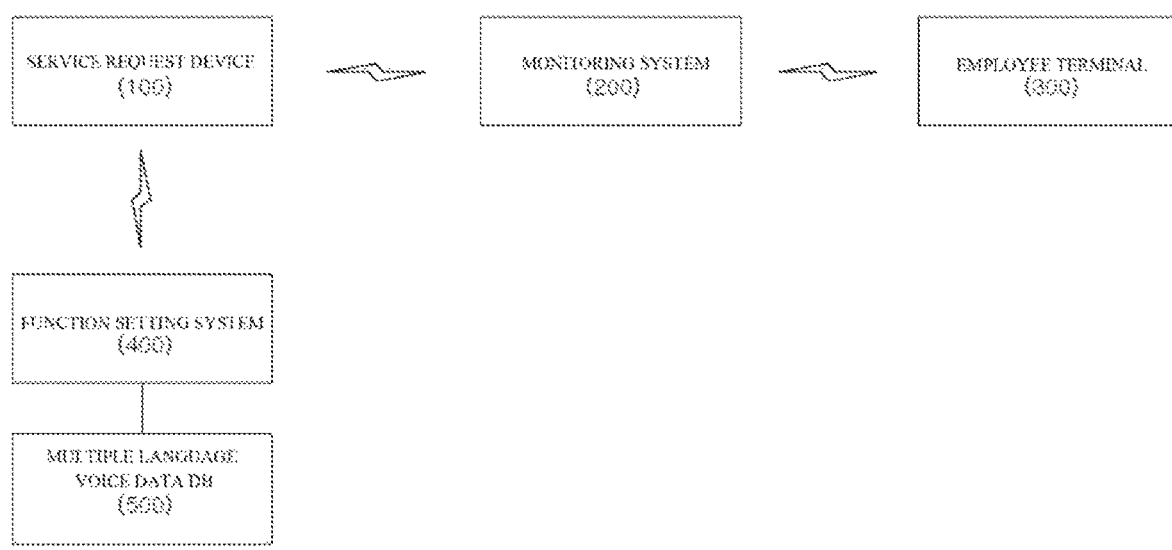
FIG. 1 is a diagram showing a structure of a service request system using a service request device for a multiple language supported room according to the present invention.
Figure 2:
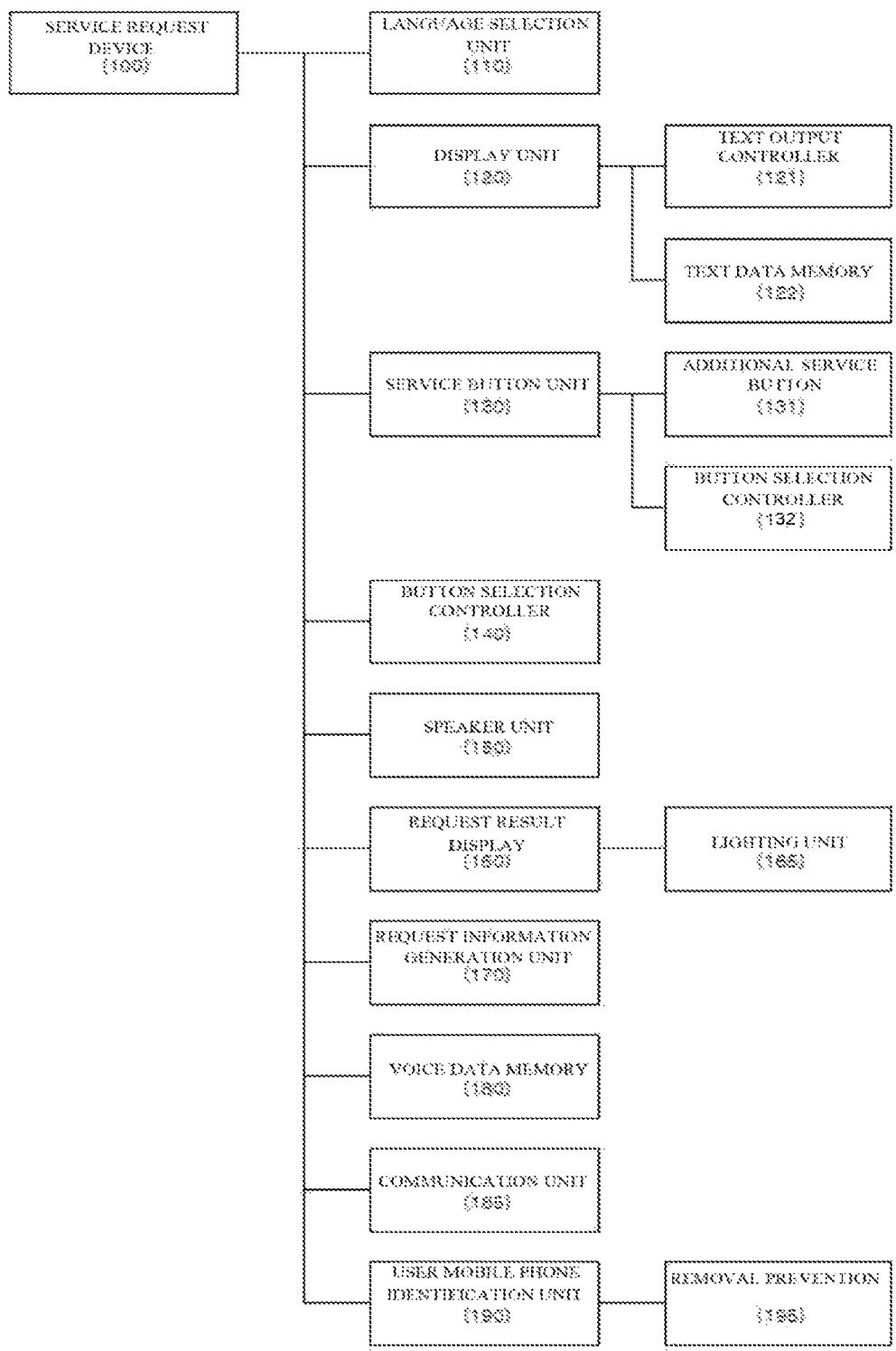
FIG. 2 is a diagram showing a structure of a service request device of a service request system using a service request device for a multiple language supported room according to the present invention.
Figure 3:
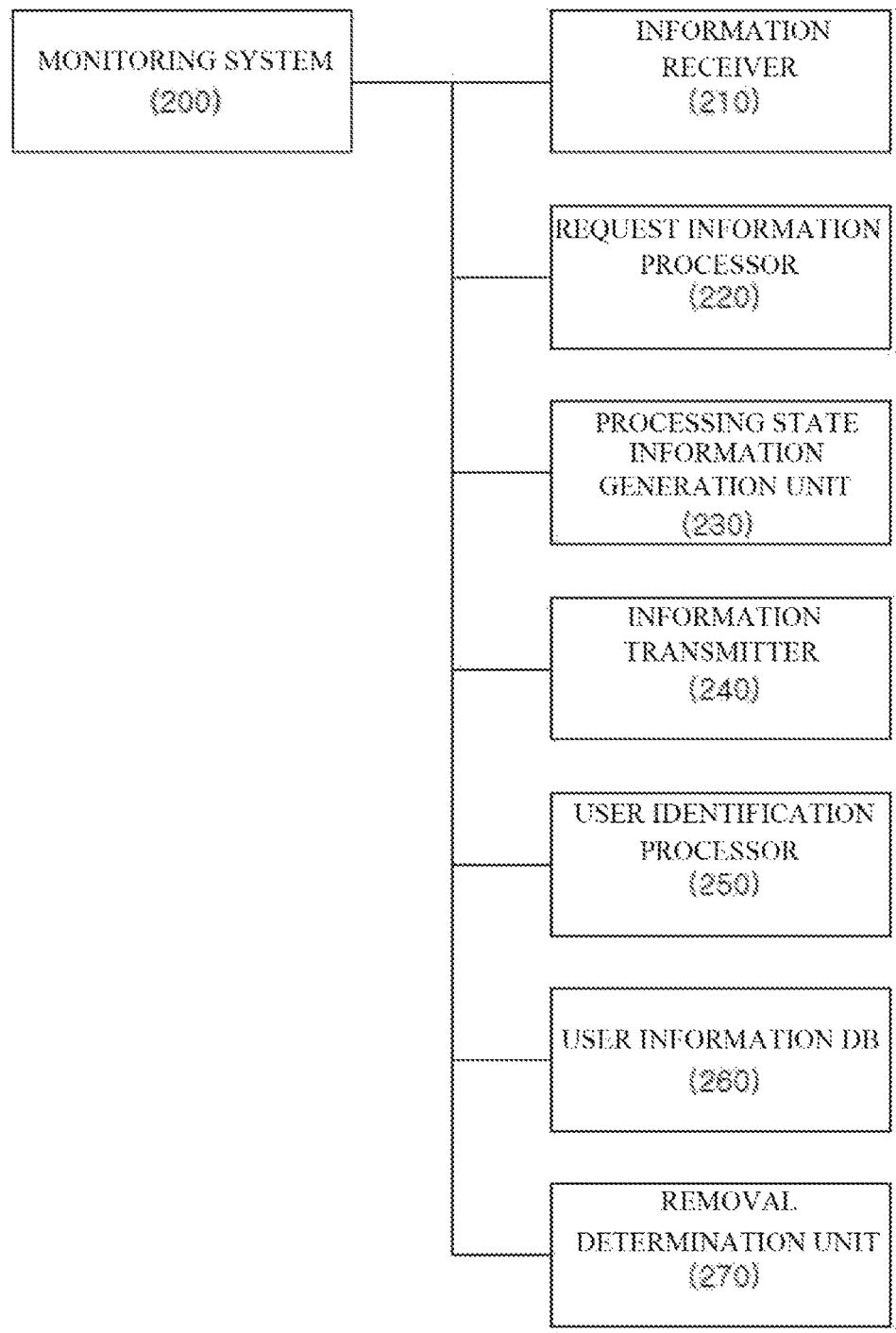
FIG. 3 is a diagram showing a structure of a monitoring system of a service request system using a service request device for a multiple language supported room according to the present invention.

As shown in FIGS. 1 to 3, a service request system for a multiple language supported room according to the present invention may include:

a service request device 100 installed in a room and configured to, in response to a desired language and service being selected by a user and a request for a specific service being made, notify the user about information on the selected service using the language selected by the user, to generate service request information corresponding to the service requested by the user, to transmit the generated service request information to a monitoring system 200, to receive service processing state information of the requested service from the monitoring system 200, and to display a processing result of the requested service through a request result display 160;

the monitoring system 200 configured to transmit the service request information transmitted from the service request device 100 to an employee terminal 300, and to generate the service processing state information of the requested service based on service processing result information indicating that processing of the requested service is scheduled or completed and to transmit the service processing state information to the service request device 100, in response to the service processing result information being received from a specific employee terminal 300; and a plurality of employee terminals 300 configured to receive the service request information from the monitoring system 200 and including an application installed therein to perform a function of generating service processing result information on a service request corresponding to the received service request information and transmitting the service processing result information to the monitoring system 200.

As shown in FIG. 1, the service request system for a multiple language supported room may further include a function setting system 400.

The function setting system 400 may add/delete an available language in the service request device 100, voice data for each language, and text data for each language, may set/change a function of a service button included in the service request device 100, and may set/change a room number to be assigned to the service request device 100.

The function setting system 400 may include a multiple language voice data DB 500 configured to store the voice data and text data for each language for a plurality of services to be supportable for a user.

The service request device 100 may be installed in each room and may indicate a service requested using a language selected by a user when a room user selects the desired language and selects the service.

For example, when the room user is an English speaker, if the user selects English as a desired language and selects a service in the service request device 100, the service request device 100 may audibly indicate information on the service selected using English and may make a request for the selected service.

The service request device 100 may generate the service request information corresponding to the service requested by the user and may transmit the service request information to the monitoring system 200, and the monitoring system 200 may receive service processing state information and may enable the user to check a service processing state through the request result display 160 formed in the service request device 100.

In detail, the service request device 100 may include: a language selection unit 110 formed to enable the user to select the desired language;

a service button unit 130 including a plurality of service buttons with a specific service being set for each button;

a button selection controller 132 configured to determine whether any one of the service buttons included in the service button unit 130 is selected by the user for a predetermined time period or according to a predetermined rule and configured to generate button selection information and to transmit the button selection information to a voice output controller 140 upon determining that the predetermined time or the predetermined rule is satisfied;

the voice output controller 140 configured to determine that a specific service button of the service button unit 130 is selected by the user upon receiving the button selection information from the button selection controller 132, configured to identify the selected service button using the button selection information, configured to extract voice data in the language selected through the language selection unit 110 among voice data corresponding to service content set to the selected service button, from a voice data memory 180, and configured to control a speaker unit 150 to output the voice data;

the speaker unit 150 configured to output the voice data extracted by the voice output controller 140 under control of the voice output controller 140;

the request result display 160 configured to display service processing state information indicating a current processing situation of the service requested by the user;

a request information generation unit 170 configured to generate service request information indicating information on the service that is selected and requested by the user through the service button unit 130;

the voice data memory 180 configured to store voice data for each language corresponding to the service content set for each of the plurality of service buttons included in the service button unit 130; and a communication unit 185 connected to the monitoring system 200 via wireless network communication and configured to transmit service request information to the monitoring system 200 or to receive processing state information from the monitoring system 200.

The language selection unit 110 may be formed on the service request device 100 to enable the user to select a desired language.

In detail, the language selection unit 110 may enable the user to select the desired language and may use any one of a button method, a touchscreen method, and a jog wheel method.

The button method of the language selection unit 110 formed on the service request device 100 may be a method of pushing a button with low force to select a language and of changing a language whenever pushing a button via toggling, the touchscreen method of the language selection unit 110 may be a method of touching a screen by a user to select a language, and the jog wheel method may be a method of rotating a jog wheel by a user to select a language.

The language selected by pushing, touching, or rotating the button in the language selection unit 110 may provide voice audio indicating the language selected through the speaker unit 150.

The service button unit 130 may include a plurality of buttons formed on one side of the service request device 100, and services may be set for the respective buttons to enable the user to select and push a desired service button.

When the user pushes the desired service button among the service buttons separately formed on the service button unit 130, service content of the service selected by the user may be audibly output, thorough the speaker unit 150, using a language that is selected by the user through the language selection unit 110.

For example, when the language selected by the language selection unit 110 is English, if a service button corresponding to a cleaning service is pushed through the service button unit 130, English announcement "You have selected cleaning service. If you push the same button again, the service request will be completed." may be audibly output.

An icon that implies service content may be displayed at one side of each button of the service button unit 130 to enable all users who uses different languages to easily identify the service content through the icon.

When the user selects any one of service buttons included in the service button unit 130, the button selection controller 132 may determine whether the user selects the service button for a predetermined time period or according to a predetermined rule and, when the predetermined time or the predetermined rule is satisfied, the button selection controller 132 may generate button selection information of the service selected by the user and may transmit the button selection information to the voice output controller 140.

In the above case, the predetermined rule may be, for example, pushing of the same service button once again after voice guidance is output.

Upon receiving the button selection information transmitted from the button selection controller 132, the voice output controller 140 may determine that a specific service button is selected by a user and may recognize a service button that is selected by the user using the button selection information.

Then, voice data of a language selected by the user among voice data corresponding to service content set to the recognized service button may be extracted from the voice data memory 180.

In addition, the voice output controller 140 may control the speaker unit 150 to output the extracted voice data.

For example, when the voice output controller 140 recognizes that a "cleaning service" button is selected based on the button selection information and a language selected through the language selection unit 110 is "English", the voice output controller 140 may extract voice data corresponding to a cleaning service that is stored in English in the voice data memory 180, may provide the voice data through the speaker unit 150, and may control the speaker unit 150 to audibly output English announcement "Cleaning service requested.".

The speaker unit 150 may be formed in the service request device 100 to output voice data corresponding to the service extracted under control of the voice output controller 140.

The request result display 160 may be formed on the service request device 100 to display a processing situation of the service requested by the user and, upon receiving the service processing state information from the monitoring system 200, the request result display 160 may display a service processing result using at least one of a voice guidance method, a lighting method, or an image display method.

In detail, for the lighting method, the request result display 160 may include a lighting unit 165 that is capable of emitting light of different colors and may turn on the lighting unit 165 with different colors depending on a processing state of the requested service.

For example, when a service is scheduled to be processed, a green lamp may be turned on and, when the service is completed, a blue lamp may be turned on.

For the image display method, the request result display 160 may display a processing state of the requested service as text in a language selected by the user through a display unit 120.

For the voice guidance method, the request result display 160 may audibly output the processing state of the requested service in the language selected by the user through the speaker unit 150.

When the processing state is displayed using the lighting method through the request result display 160, an employee accepts the requested service and, then, transmits service processing state information indicating that the service is scheduled to be processed, such as "processing scheduled", with respect to the requested service through the employee terminal 300 and, in this case, light of color corresponding to processing scheduled may be emitted and, when the employee accepts service processing state information indicating that that the service is completely processed, such as "processing completed", with respect to the requested service through the employee terminal 300, light of color corresponding to processing completed may be emitted.

When the processing state is displayed using the image display method through the request result display 160, an employee accepts the requested service and, then, transmits service processing state information indicating that the service is scheduled to be processed, such as "processing scheduled", with respect to the requested service through the employee terminal 300 and, in this case, the request result display 160 may display text corresponding to processing scheduled in a language selected by the user through the display unit 120 and, when the employee accepts service processing state information indicating that that the service is completely processed, such as "processing completed", with respect to the requested service through the employee terminal 300 and, in this case, the request result display 160 may display text corresponding to processing completed in the language selected by the user through the display unit 120.

When the processing state is displayed using the voice guidance method through the request result display 160, an employee accepts the requested service and, then, transmits service processing state information indicating that the service is scheduled to be processed, such as "processing scheduled", with respect to the requested service through the employee terminal 300 and, in this case, the request result display 160 may audibly output sound corresponding to processing scheduled through the speaker unit 150 and, when the employee accepts service processing state information indicating that that the service is completely processed, such as "processing completed", with respect to the requested service through the employee terminal 300 and, in this case, the request result display 160 may audibly output sound corresponding to processing completed through the speaker unit 150.

The request information generation unit 170 may generate service request information that is information on a service that is selected and requested by a user through the service button unit 130 and the service request information may include selected language information, requested service information, room number information, requested time information, unique information of the service request device 100, and the like.

In detail, the service request information may include a language selected by the user, a requested service selected by the user, a room number of the user, a time when the user makes a request for a service, and information on a unique number of the service request device 100, and the service request information generated through the request information generation unit 170 may be generated in the form of, for example, "English_Cleaning Services_No. 1001_09:10_1001A" and may be transmitted to the monitoring system 200.

The voice data memory 180 may store voice data for each language corresponding to service content set for each service button of the service button unit 130.

The voice data stored in the voice data memory 180 may be, for example, "한국어_청소서비 스_청소서비스를 요청합니다." (which means "Korean_Cleaning Service_To request a cleaning service."), "한국어_세탁서비 스_세탁서비스를 요청합니다." (which means "Korean_Laundry Service_To request a laundry service."), or "한국어_조식서비 스_조식서비스를 요청합니다." (which means "Korean_Breakfast Service_To request a breakfast service").

In addition, voice data for each language corresponding to service content, such as "English_Cleaning Services_To request a cleaning service.", may be stored.

The communication unit 185 may be used for connection between the service request device 100 and the monitoring system 200 via a wired or wireless communication network and may transmit the service request information generated by the service request device 100 to the monitoring system 200 or may receive the service processing state information transmitted from the monitoring system 200.

According to the present invention, the communication unit 185 may select and use any one of communication methods of a wireless network such as CDMA and LTE, short-range communication such as Wi-Fi and Bluetooth, or wired communication.

The monitoring system 200 may receive the service request information transmitted from the service request device 100, may transmit the received service request information to the employee terminal 300, may receive service processing result information indicating that a requested service is scheduled to be processed or is completely processed from the employee terminal 300, may generate service processing state information using the received service processing result information, and may transmit the service processing state information to the service request device 100.

The monitoring system 200 may process a service request of the service request device 100 and may function as a relay between the service request device 100 and the employee terminal 300 and, for example, when the service request information transmitted from the service request device 100 is "English_Cleaning Services_No. 1001_09:10_1001A", the monitoring system 200 may transmit the service request information to the employee terminal 300 related to a cleaning service and, upon receiving service processing result information indicating "processing scheduled" from the employee terminal 300 that transmits the service request information, the monitoring system 200 may generate service processing state information indicating that the cleaning service selected by the user is scheduled to be processed and may transmit the service processing state information to the service request device 100.

The service request device 100 may indicate the service processing state information to the user using at least one of a lighting method, an image display method, or a voice guidance method according to service processing state information indicating that a cleaning service is scheduled to be processed soon.

In detail, the monitoring system 200 may include: an information receiver 210 configured to receive service request information transmitted from the service request device 100 and service processing result information transmitted from the employee terminal 300;

a request information processor 220 configured to recognize the service request information transmitted from the service request device 100, configured to determine an employee who is capable of processing a service, and configured to control an information transmitter 240 to transmit the service request information to the employee terminal 300 of the determined employee;

a processing state information generation unit 230 configured to generate service processing state information of the service requested by the user using the service processing result information transmitted from the employee terminal 300 and configured to control the information transmitter 240 to transmit the generated service processing state information to the service request device 100; and the information transmitter 240 configured to transmit the service request information to the employee terminal 300 under control of the request information processor 220 and configured to transmit the service processing state information to the service request device 100 under control of the processing state information generation unit 230.

The information receiver 210 may receive the service request information from the service request device 100 or may receive the service processing result information from the employee terminal 300.

The service request information received from the service request device 100 through the information receiver 210 may be information such as "English_Cleaning Services_No. 1001_09:10_1001_A" and the service processing result information received from the employee terminal 300 may be information such as "processing scheduled" or "processing completed".

The request information processor 220 may recognize the service request information transmitted from the service request device 100, may determine an employee who is capable of processing a service, and may transmit the service request information to the determined employee terminal 300 through the information transmitter 240 and, for example, when the service request information transmitted from the service request device 100 is related to a cleaning service, the request information processor 220 may select an employee who is capable of processing the cleaning service and may transmit the service request information to the corresponding employee terminal 300.

When service processing result information is not received from the corresponding employee terminal 300 for a predetermined time period after the request information processor 220 transmits the service request information to the employee terminal 300 or service processing result information of processing completed is not received from the corresponding employee terminal 300 for a predetermined time period after service processing result information indicating processing scheduled is received from the employee terminal 300, a processing check message may be transmitted to the corresponding employee terminal 300 and, simultaneously, a service processing delay message may be transmitted to a manager terminal.

When the service processing result information is not received by the monitoring system 200 from the employee terminal 300 in response to the service request information transmitted to the employee terminal 300, the processing check message may be transmitted to the corresponding employee terminal 300 and, simultaneously, a service delay message of a corresponding employee may also be transmitted to the manager terminal that manages a service request system according to the present invention.

For example, when service processing result information is not received from the employee terminal 300, a message such as "English_Cleaning Services_No. 1001_09:10_To check service processing requested to 1001A" may be transmitted to the employee terminal 300 from the request information processor 220 and, when service processing result information of completed processing is not received from the corresponding employee terminal 300 for a predetermined time period after service processing result information of processing scheduled is received from the employee terminal 300, a message such as "Scheduled English_Cleaning Services_No. 1001_09:10_To confirm service of 1001A" may be transmitted.

When processing is not completed even if a predetermined time period elapses in a processing scheduled state, a processing delay message may also be transmitted to a manager terminal, and the processing delay message transmitted to the manager terminal may be transmitted as a message such as "Korean_Cleaning Service_No. 1001_09:10_1001A To check a delay state of scheduled service processing".

The processing state information generation unit 230 may generate service processing state information using the service processing result information transmitted from the employee terminal 300, when the service processing result information transmitted from the employee terminal 300 indicates that processing is scheduled, the processing state information generation unit 230 may generate service processing state information indicating that processing is scheduled and, when the service processing result information indicates that processing is completed, the processing state information generation unit 230 may generate service processing state information indicating that processing is completed and may transmit the service processing state information to the service request device 100.

The service processing state information generated through the processing state information generation unit 230 may be generated as information, for example, "Requested cleaning service_scheduled" or "Requested cleaning service_completed" and may be transmitted to the service request device 100 of a corresponding user through the information transmitter 240.

The information transmitter 240 may transmit service request information to the employee terminal 300 and may transmit the generated service processing result information to the service request device 100 that makes a request for the corresponding service and, when the employee terminal 300 does not receive a processing result such as processing delay or processing scheduled, the information transmitter 240 may transmit a service processing check message generated through the request information processor 220 to the employee terminal 300 and may transmit a processing delay message to a manager terminal.

The employee terminal 300 may receive service request information from the monitoring system 200, may generate service processing result information in response to the received service request information, and may transmit the service processing result information to the monitoring system 200.

To this end, the employee terminal 300 may include an exclusive application installed therein with a function of receiving the service request information provided from the monitoring system 200, a function of displaying information included in the service request information on a screen of the employee terminal 300, a function of asking an employee whether a requested service is processed (is scheduled to be processed or is completely processed), a function of generating service processing result information based on an answer of the employee with respect to the asking, and a function of transmitting the generated service processing result information to the monitoring system 200.

That is, the exclusive application may generate service processing result information corresponding to a current state of "processing scheduled" or "processing completed" in response to the service request information received from the employee terminal 300, for example, "Korean_Cleaning Service_No. 1001_09:10_1001A" and may transmit the service processing result information to the monitoring system 200.

An application installed in the employee terminal 300 may support the employee terminal 300 to be connected to the monitoring system 200 through wireless network communication, may support the employee terminal 300 to display service request information transmitted from the monitoring system 200 on a screen formed on the employee terminal 300 and to allow an employee to input a processing state of a requested service corresponding to the received service request information, may generate service processing result information based on the information input by the employee, and may transmit the service processing result information to the monitoring system 200.

Accordingly, the application may support the employee terminal 300 to receive service request information from the monitoring system 200→to input a service processing state of request information→to generate service processing result information and to transmit the service processing result information to the monitoring system 200.

The function setting system 400 may further add other language data to language data stored in the service request device 100 or may delete unnecessary language data.

Functions of respective buttons formed on the service request device 100 may be set or changed.

For example, even if a cleaning service function is previously set to a specific button, the button may be set to change the cleaning service function to a food and beverage delivery service function as necessary.

When the service request device 100 is used in another room, room number information may be set and changed to correspond to the room.

The voice data DB 500 may store voice data for each language with respect to a plurality of services to be supportable for a user, and voice data for each language may be added and deleted by the function setting system 400.

The service request device 100 according to the present invention may further include: the display unit 120 configured to display text data that is extracted under control of a text output controller 121;

the text output controller 121 configured to receive button selection information from the button selection controller 132, to determine that a specific service button of the service button unit 130 is selected by a user upon receiving the button selection information, to identify the selected service button using the button selection information, to extract text data of a language selected through the language selection unit 110 among text data corresponding to service content set to the selected service button, from a text data memory 122, and to control the display unit 120 to display the text data; and the text data memory 122 configured to store text data for each language corresponding to service contents set for a plurality of respective service buttons included in the service button unit 130.

The display unit 120 may display text data of service content of the selected service button in the language selected by the user to allow the user to visually check the selected service.

For example, when a cleaning service button is selected, the display unit 120 may display text such as "청소" (which means "clean") or "clean".

The text output controller 121 may receive the button selection information generated from the button selection controller 132 when a user selects a service button, may extract text data of a language that is selected by the user through the language selection unit 110 among text data corresponding to service content set to the selected service button from the text data memory 122, and may control the display unit 120 to display the text data.

For example, the user may select a service button of a cleaning service, and the button selection controller 132 may generate button selection information with respect to the selected service and may transmit the button selection information to the text output controller 121.

The text output controller 121 may identify a service button based on the received button selection information, may extract text data of a language selected by the user among text data corresponding to a service set to the identified service button from the text data memory 122, and may display the extracted text data, for example, "To request a cleaning service" through the display unit 120.

The text data memory 122 may store text data for each language corresponding to a service set to each service button included in the service button unit 130.

The text data for each language stored in the text data memory 122 may be stored as service content for each service button, such as "한국어_청소서비스를 요청하였습니다"

(which means "Korean_To request a cleaning service") or "English_Cleaning Services_To request a cleaning service".

The service request device 100 may further include;

a user mobile phone identification unit 190 configured to receive user mobile phone identification information via a user mobile phone and short-range communication, to extract language information of the user from the received user mobile phone identification information or to extract language information from a language that is selected by the user through the language selection unit 110, and to transmit the user mobile phone identification information and the language information to the monitoring system 200.

When the service request device 100 further includes the user mobile phone identification unit 190, the monitoring system 200 may further include;

a user identification processor 250 configured to match the user mobile phone identification information and language information transmitted from the user mobile phone identification unit 190 and to store the matched information in a user information DB 260, to recognize whether the same identification information as the user mobile phone identification information transmitted from the user mobile phone identification unit 190 is stored in the user information DB 260, and to transmit the language information matched with the corresponding user mobile phone identification information to the user mobile phone identification unit 190 when the same identification information is stored in the user information DB 260, and the user information DB 260 configured to match and store the user mobile phone identification information and language information transmitted from the user mobile phone identification unit 190.

The user mobile phone identification unit 190 may control the language selection unit 110 to select a language corresponding to the received language information without language selection of a user through the language selection unit 110 upon receiving the language information from the user identification processor 250.

The user mobile phone identification unit 190 may receive user mobile phone identification information from a user mobile phone via short-range communication between the service request device 100 and the user mobile phone.

The user mobile phone identification information may include a terminal unique number or a user mobile phone number.

In addition, the user mobile phone identification unit 190 may extract language information on a language used by the user from the user mobile phone identification information or may extract language information from a language that is selected by the user through the language selection unit 110.

That is, the case in which language information on a language used by a user is extracted from the user mobile phone identification information will now be described. The language information may be extracted from the user mobile phone identification information and, in this regard, mobile phone identification information is different for each country and, thus, language information of the user may be acquired from the mobile phone identification information.

The user identification processor 250 may be formed in the monitoring system 200, may match the user mobile phone identification information and user language information transmitted from the user mobile phone identification unit 190 and may store the matched information in the user information DB 260.

The user identification processor 250 may recognize whether the same identification information as the user mobile phone identification information transmitted from the user mobile phone identification unit 190 is stored in the user information DB 260 and, when the same identification information as the user mobile phone identification information is stored in the user information DB 260, the user identification processor 250 may transmit the language information matched with the corresponding user mobile phone identification information to the user mobile phone identification unit 190 of the service request device 100.

For example, when the user mobile phone identification information is 010-**-, the user mobile phone identification unit 190 may recognize whether the same identification information as 010-- as the user mobile phone identification information is stored in the user information DB 260 and, when the same identification information is stored in the user information DB 260, the user mobile phone identification unit 190 may identify the language information matched with the identification information. When the matched language information is English, the language information "English" may be transmitted to the user mobile phone identification unit 190 of the service request device 100**.

The user mobile phone identification unit 190 that receives the language information "English" may control the language selection unit 110 to select "English" as a language corresponding to the received language information without language selection of a user through the language selection unit 110.

That is, a language may be automatically selected through the user mobile phone identification unit 190 and, thus, it may not be necessary to select a language by the user through the service request device 100.

The user information DB 260 may match and store the user mobile phone identification information and the language information.

In the service request system according to the present invention, the service button unit 130 may further include an additional service button 131.

When the additional service button 131 is selected by a user, the user mobile phone identification unit 190 may transmit a guidance message for installation of a service application in a user mobile phone to the user mobile phone to use a service function other than the services set to the service button unit 130, and the user may install the service application in the mobile phone of the user according to the guidance message and, then, may use the service function other than the service set to the service button unit 130 using the service application.

That is, the additional service button 131 may be a component for allowing a user to use an additional service function that is not capable of being provided through the service button unit 130 due to a limited size of the service request device 100.

For example, assuming that only three service buttons of "cleaning service", "laundry service", and "breakfast service" are formed on the service button unit 130 of the service request device 100, an additional service function such as "vehicle standby service and travel destination reservation service" other than the three services may be selected through the installed service application according to the guidance message.

The guidance message may provide information on a specific website to download and install the service application in a mobile phone of a customer.

For example, when the guidance message includes information on the specific website from which the service application is downloadable, the user may access the specific website included in the guidance message, may download the service application, and may install the service application in the mobile phone of the user.

Accordingly, when a service function other than service buttons formed on the service button unit 130 of the service request device 100 is selected through the additional service button 131, a guidance message for guiding download and use of a service application to use service functions other than the service set to the service button unit 130 may be transmitted from the service button unit 130 to the user mobile phone, and the user may install the service application in the mobile phone of the user and may additionally select a service function according to the guidance message.

The service request device 100 may further include a removal prevention unit 195.

The removal prevention unit 195 may prevent the service request device 100 from being removed from a room, may periodically detect signal intensity of wireless communication, and may transmit the detected signal intensity value to the monitoring system 200.

In the above case, the signal of wireless communication may be, for example, a Wi-Fi signal, and the removal prevention unit 195 may periodically scan a Wi-Fi signal and, in this case, may periodically transmit an intensity value of the scanned Wi-Fi signal to the monitoring system 200.

When the service request device 100 includes the removal prevention unit 195, the monitoring system 200 may further include a removal determination unit 270.

The removal determination unit 270 may continuously and accumulatively store signal intensity values transmitted from the removal prevention unit 195 and, in this case, an average value of the accumulatively stored signal intensity values may be calculated and stored.

When the signal intensity value transmitted from the removal prevention unit 195 is lower than the average value by a setting value or more at a specific time point, the service request device 100 may be determined to be removed from a room.

The setting value may be a value that is capable of being set by the user and, in general, when the signal intensity value is equal to or less than (average value-setting value), this may refer to a situation in which the service request device 100 has been removed from a room and a radio signal is not cable of being scanned.

Upon determining that the service request device 100 has been removed, the removal determination unit 270 may transmit a notification message indicating that the service request device 100 has been removed, to a manager terminal.

As shown in FIG. 2, a service request device for a multiple language supported room according to the present invention may include:

the language selection unit 110 formed to allow a user to select a desired language;

the service button unit 130 including a plurality of service buttons with specific services set thereto;

the button selection controller 132 configured to determine whether any one of the service buttons included in the service button unit 130 is selected by the user for a predetermined time period or according to a predetermined rule and configured to generate button selection information and to transmit the button selection information to the voice output controller 140 upon determining that the predetermined time or the predetermined rule is satisfied;

the voice output controller 140 configured to determine that a specific service button of the service button unit 130 is selected by the user upon receiving the button selection information from the button selection controller 132, configured to identify the selected service button using the button selection information, configured to extract voice data in the language selected through the language selection unit 110 among voice data corresponding to service content set to the selected service button, from a voice data memory 180, and configured to control a speaker unit 150 to output the voice data;

the speaker unit 150 configured to output the voice data extracted by the voice output controller 140 under control of the voice output controller 140;

the request result display 160 configured to display service processing state information indicating a current processing situation of the service requested by the user;

the request information generation unit 170 configured to generate service request information indicating information on the service that is selected and requested by the user through the service button unit 130;

the voice data memory 180 configured to store voice data for each language corresponding to the service content set for each of the plurality of service buttons included in the service button unit 130; and the communication unit 185 connected to the monitoring system 200 via wireless network communication and configured to transmit service request information to the monitoring system 200 or to receive processing state information from the monitoring system 200.

The language selection unit 110 may be formed on the service request device 100 to enable the user to select a desired language.

In detail, the language selection unit 110 may enable the user to select the desired language and may use any one of a button method, a touchscreen method, and a jog wheel method.

The button method of the language selection unit 110 formed on the service request device 100 may be a method of pushing a button with low force to select a language and of changing a language whenever pushing a button via toggling, the touchscreen method of the language selection unit 110 may be a method of touching a screen by a user to select a language, and the jog wheel method may be a method of rotating a jog wheel by a user to select a language.

The language selected by pushing, touching, or rotating the button in the language selection unit 110 may provide voice audio indicating the language selected through the speaker unit 150.

The service button unit 130 may include a plurality of buttons formed on one side of the service request device 100, and services may be set for the respective buttons to enable the user to select and push a desired service button.

When the user pushes the desired service button among the service buttons separately formed on the service button unit 130, service content of the service selected by the user may be audibly output, thorough the speaker unit 150, using a language that is selected by the user through the language selection unit 110.

For example, when the language selected by the language selection unit 110 is English, if a service button corresponding to a cleaning service is pushed through the service button unit 130, English announcement "You have selected the cleaning service." may be audibly output.

An icon that implies service content may be displayed at one side of each button of the service button unit 130 to enable all users who uses different languages to easily identify the service content through the icon.

When the user selects any one of service buttons included in the service button unit 130, the button selection controller 132 may determine whether the user selects the service button for a predetermined time period and, when the user selects the service button for a predetermined time period, the button selection controller 132 may generate button selection information of the service selected by the user and may transmit the button selection information to the voice output controller 140.

Upon receiving the button selection information transmitted from the button selection controller 132, the voice output controller 140 may determine that a specific service button is selected by a user and may recognize a service button that is selected by the user using the button selection information.

Then, voice data of a language selected by the user among voice data corresponding to service content set to the recognized service button may be extracted from the voice data memory 180.

In addition, the voice output controller 140 may control the speaker unit 150 to output the extracted voice data.

For example, when the voice output controller 140 recognizes that a "cleaning service" button is selected based on the button selection information and a language selected through the language selection unit 110 is "English", the voice output controller 140 may extract voice data corresponding to a cleaning service that is stored in English in the voice data memory 180, may provide the voice data through the speaker unit 150, and may control the speaker unit 150 to audibly output English announcement "Cleaning service is requested.".

The speaker unit 150 may be formed in the service request device 100 to output voice data corresponding to the service extracted under control of the voice output controller 140.

The request result display 160 may be formed on the service request device 100 to display a processing situation of the service requested by the user and, upon receiving the service processing state information from the monitoring system 200, the request result display 160 may display a service processing result using at least one of a lighting method, an image display method, or a voice guidance method.

In detail, for the lighting method, the request result display 160 may include a lighting unit 165 that is capable of emitting light of different colors to turn on the lighting unit 165 with different colors depending on a processing state of the requested service.

For example, when a service is scheduled to be processed, a green lamp may be turned on and, when the service is completed, a blue lamp may be turned on.

For the image display method, the request result display 160 may display a processing state of the requested service as text in a language selected by the user through a display unit 120.

For the voice guidance method, the request result display 160 may audibly output the processing state of the requested service in the language selected by the user through the speaker unit 150.

When the processing state is displayed using the lighting method through the request result display 160, an employee accepts the requested service and, then, transmits service processing state information indicating that the service is scheduled to be processed, such as "processing scheduled", with respect to the requested service through the employee terminal 300 and, in this case, light of color corresponding to processing scheduled may be emitted and, when the employee accepts service processing state information indicating that the service is completely processed, such as "processing completed", with respect to the requested service through the employee terminal 300, light of color corresponding to processing completed may be emitted.

When the processing state is displayed using the image display method through the request result display 160, an employee accepts the requested service and, then, transmits service processing state information indicating that the service is scheduled to be processed, such as "processing scheduled", with respect to the requested service through the employee terminal 300 and, in this case, the request result display 160 may display text corresponding to processing scheduled in a language selected by the user through the display unit 120 and, when the employee accepts service processing state information indicating that that the service is completely processed, such as "processing completed", with respect to the requested service through the employee terminal 300 and, in this case, the request result display 160 may display text corresponding to processing completed in the language selected by the user through the display unit 120.

When the processing state is displayed using the voice guidance method through the request result display 160, an employee accepts the requested service and, then, transmits service processing state information indicating that the service is scheduled to be processed, such as "processing scheduled", with respect to the requested service through the employee terminal 300 and, in this case, the request result display 160 may audibly output sound corresponding to processing scheduled through the speaker unit 150 and, when the employee accepts service processing state information indicating that that the service is completely processed, such as "processing completed", with respect to the requested service through the employee terminal 300 and, in this case, the request result display 160 may audibly output sound corresponding to processing completed through the speaker unit 150.

The request information generation unit 170 may generate service request information that is information on a service that is selected and requested by a user through the service button unit 130 and the service request information may include selected language information, requested service information, room number information, requested time information, unique information of the service request device 100, and the like.

In detail, the service request information may include a language selected by the user, a requested service selected by the user, a room number of the user, a time when the user makes a request for a service, and information on a unique number of the service request device 100, and the service request information generated through the request information generation unit 170 may be generated in the form of, for example, "English_Cleaning Services_No. 1001_09: 10_1001A" and may be transmitted to the monitoring system 200.

The voice data memory 180 may store voice data for each language corresponding to service content set for each service button of the service button unit 130.

The voice data stored in the voice data memory 180 may be, for example, "한국어_청소서비 스_청소서비스를 요청합니다." (which means "Korean_Cleaning Service_To request a cleaning service."), "한국어_세탁서비 스_세탁서비스를 요청합니다." (which means "Korean_Laundry Service_To request a laundry service."), or "한국어_조식서비스 _조식서비스를 청합니다." (which means "Korean_Breakfast Service_To request a breakfast service").

In addition, voice data for each language corresponding to service content, such as "English_Cleaning Services_To request a cleaning service.", may be stored.

The communication unit 185 may be used for connection between the service request device 100 and the monitoring system 200 via a wired or wireless communication network and may transmit the service request information generated by the service request device 100 to the monitoring system 200 or may receive the service processing state information transmitted from the monitoring system 200.

According to the present invention, the communication unit 185 may select and use any one of communication methods of a wireless network such as CDMA and LTE, short-range communication such as Wi-Fi and Bluetooth, or wired communication.

The service request device 100 for a multiple language supported room according to the present invention may add/delete an available language in the service request device 100, voice data for each language, and text data for each language, may set/change a function of a service button included in the service request device 100, and may set/change a room number to be assigned to the service request device 100, through the external function setting system 400.

The function setting system 400 may further add other languages, voice data for each language, and text data for each language to a language, voice data for each language, and text data for each language that are stored in the service request device 100 or may delete unnecessary languages, voice data for each language, and text data for each language.

Functions of respective buttons formed on the service request device 100 may be set or changed.

When the service request device 100 is used in another room, room number information may be set and changed to correspond to the room.

The service request device 100 according to the present invention may further include: the display unit 120 configured to display text data that is extracted under control of a text output controller 121;

the text output controller 121 configured to receive button selection information from the button selection controller 132, to determine that a specific service button of the service button unit 130 is selected by a user upon receiving the button selection information, to identify the selected service button using the button selection information, to extract text data of a language selected through the language selection unit 110 among text data corresponding to service content set to the selected service button, from a text data memory 122, and to control the display unit 120 to display the text data; and the text data memory 122 configured to store text data for each language corresponding to service contents set for a plurality of respective service buttons included in the service button unit 130.

The display unit 120 may display text data of service content of the selected service button in the language selected by the user to allow the user to visually check the selected service.

For example, when a cleaning service button is selected, the display unit 120 may display text such as "청소" (which means "clean") or "clean".

The text output controller 121 may receive the button selection information generated from the button selection controller 132 when a user selects a service button, may extract text data of a language that is selected by the user through the language selection unit 110 among text data corresponding to service content set to the selected service button from the text data memory 122, and may control the display unit 120 to display the text data.

For example, the user may select a service button of a cleaning service, and the button selection controller 132 may generate button selection information with respect to the selected service and may transmit the button selection information to the text output controller 121.

The text output controller 121 may identify a service button based on the received button selection information, may extract text data of a language selected by the user among text data corresponding to a service set to the identified service button from the text data memory 122, and may display the extracted text data, for example, "To request a cleaning service" through the display unit 120.

The text data memory 122 may store text data for each language corresponding to a service set to each service button included in the service button unit 130.

The text data for each language stored in the text data memory 122 may be stored as service content for each service button, such as "한국어_청소서비스를 요청하였습니다" (which means "Korean_To request a cleaning service") or "English_Cleaning Services_To request a cleaning service".

The service request device 100 may further include the user mobile phone identification unit 190 configured to receive user mobile phone identification information via a user mobile phone and short-range communication, to extract language information of the user from the received user mobile phone identification information or to extract language information from a language that is selected by the user through the language selection unit 110, and to transmit the user mobile phone identification information and the language information to the monitoring system 200.

When the service request device 100 further includes the user mobile phone identification unit 190, the monitoring system 200 may further include;

the user identification processor 250 configured to match the user mobile phone identification information and language information transmitted from the user mobile phone identification unit 190 and to store the matched information in a user information DB 260, to recognize whether the same identification information as the user mobile phone identification information transmitted from the user mobile phone identification unit 190 is stored in the user information DB 260, and to transmit the language information matched with the corresponding user mobile phone identification information to the user mobile phone identification unit 190 when the same identification information is stored in the user information DB 260, and the user information DB 260 configured to match and store the user mobile phone identification information and language information transmitted from the user mobile phone identification unit 190.

The user mobile phone identification unit 190 may control the language selection unit 110 to select a language corresponding to the received language information without language selection of a user through the language selection unit 110 upon receiving the language information from the monitoring system 200.

The user mobile phone identification unit 190 may receive user mobile phone identification information from a user mobile phone via short-range communication between the service request device 100 and the user mobile phone.

The user mobile phone identification information may include a terminal unique number or a user mobile phone number.

In addition, the user mobile phone identification unit 190 may extract language information on a language used by the user from the user mobile phone identification information or may extract language information from a language that is selected by the user through the language selection unit 110.

That is, the case in which language information on a language used by a user is extracted from the user mobile phone identification information will now be described. The language information may be extracted from the user mobile phone identification information and, in this regard, mobile phone identification information is different for each country and, thus, language information of the user may be acquired from the mobile phone identification information.

The service button unit 130 of the service request device 100 according to the present invention may further include the additional service button 131.

When the additional service button 131 is selected by a user, the user mobile phone identification unit 190 may transmit a guidance message for installation of a service application in a user mobile phone to the user mobile phone to use a service function other than a service set to the service button unit 130, and the user may install the service application in the mobile phone of the user according to the guidance message and, then, may use the service function other than the service set to the service button unit 130 using the service application.

That is, the additional service button 131 may be a component for allowing a user to use an additional service function that is not capable of being provided through the service button unit 130 due to a limited size of the service request device 100.

For example, assuming that only three service buttons of "cleaning service", "laundry service", and "breakfast service" are formed on the service button unit 130 of the service request device 100, an additional service function such as "vehicle standby service and a travel destination reservation service" other than the three services may be selected through the installed service application according to the guidance message.

The guidance message may provide information on a specific website to download and install the service application in a mobile phone of a customer.

For example, when the guidance message provides information on the specific website from which the service application is downloadable, the user may access the specific website included in the guidance message, may download the service application, and may install the service application in the mobile phone of the user.

Accordingly, when a service function other than service buttons formed on the service button unit 130 of the service request device 100 is selected through the additional service button 131, a guidance message for guiding download and use of a service application to use service functions other than the service set to the service button unit 130 may be transmitted from the service button unit 130 to the user mobile phone, and the user may install the service application in the mobile phone of the user and may additionally select a service function according to the guidance message.

The service request device 100 may further include the removal prevention unit 195.

The removal prevention unit 195 may prevent the service request device 100 from being removed from a room, may periodically detect signal intensity of wireless communication, and may transmit the detected signal intensity value to the monitoring system 200.

In the above case, the signal of wireless communication may be, for example, a Wi-Fi signal, and the removal prevention unit 195 may periodically scan a Wi-Fi signal and, in this case, may periodically transmit an intensity value of the scanned Wi-Fi signal to the monitoring system 200.

When the service request device 100 includes the removal prevention unit 195, the monitoring system 200 may further include the removal determination unit 270.

The removal determination unit 270 may continuously and accumulatively store signal intensity values transmitted from the removal prevention unit 195 and, in this case, an average value of the accumulatively stored signal intensity values may be calculated and stored.

When the signal intensity value transmitted from the removal prevention unit 195 is lower than the average value at a specific time point, the service request device 100 may be determined to be removed from a room.

Upon determining that the service request device 100 is removed from the room, the removal determination unit 270 may transmit a notification message indicating that the service request device 100 has been removed, to a manager terminal.

The aforementioned service request device 100 may be embodied as a portable mobile electronic device such as a tablet PC or a portable phone and, in this case, the service request device may include a service request application installed therein, which will be described below.

Hereinafter, although the case in which a portable mobile electronic device with a service request application installed therein is embodied as the service request device 100 will be described, detailed technological features have been already described with regard to the service request device 100 and, thus, a detailed description will be omitted and only schematic structural features will be described herein.

The service request device 100 for a multiple language supported room according to the present invention may include a service request application installed therein to execute a service request and, in this case, the service request application may execute:

a language selection function for allowing a user to select a desired language;

a service button setting function for setting specific services to a plurality of respective service buttons embodied as images;

a button selection control function of determining whether any one of the embodied service buttons is selected by the user for a predetermined time period or according to a predetermined rule and generating button selection information upon determining that the predetermined time or the predetermined rule is satisfied;

a voice output control function of determining that a specific service button is selected by the user when the button selection information is generated, identifying the selected service button using the button selection information, and controlling a speaker to output voice data in the language selected by the user among voice data corresponding to the service content set to the selected service button;

a request result display function of displaying service processing state information indicating a current processing situation of the service requested by the user;

a request information generating function of generating service request information on the service that is selected by the user through a service button;

a voice data memory function of storing voice data for each language corresponding to service contents set to the plurality of respective service buttons; and a communication function of transmitting service request information to the monitoring system 200 or receiving processing state information from the monitoring system 200.

The service request device may be a portable mobile electronic device.

The service request information may include user selection language information, requested service information selected by a user, room number information, request time information, and unique information of the service request device 100.

The request result display function may notify a user about a current processing state of a requested service with respect to a service requested by the user and the processing state of the requested service may be indicated to the user using at least one of a lighting method, an image display method, or a voice guidance method.

For the lighting method, the request result display function may turn on a lighting unit that is capable of emitting light of different colors to emit light of different colors depending on a processing state of the requested service through the lighting unit.

For the image display method, the request result display function may display a processing state of the requested service as text in a language selected by the user through a display unit.

For the voice guidance method, the request result display function may audibly output the processing state of the requested service in the language selected by the user through a speaker.

In addition, the service request application may further execute a function of adding/deleting an available language in the service request device 100, voice data for each language, and text data for each language, a function of setting/changing a function of a service button embodied as an image, and a function of setting/changing a room number to be assigned to the service request device, through the external function setting system 400.

In addition, the service request application may further execute:

a text output control function of determining that a specific service button is selected by a user when button selection information is generated, identifying the selected service button using the button selection information, and controlling a display unit to display text data of a language selected by the user among text data corresponding to the service content set to the selected service button; and a text data memory function of storing text data for each language corresponding to service contents set to the plurality of respective service buttons.

In addition, the service request application may further execute;

a user mobile phone identification function of receiving user mobile phone identification information via a user mobile phone and short-range communication, extracting user language information from the received user mobile phone identification information or extracting language information from the language selected by the user, transmitting the user mobile phone identification information and the language information to the monitoring system 200, and selecting a language corresponding to the received language information without language selection of the user upon receiving the language information from the monitoring system 200.

In addition, when the additional service button is further embodied as an image in addition to a plurality of service buttons embodied as images and the additional service button is selected by a user, the service request application may execute a function of transmitting a guidance message for installation of a service application in a user mobile phone to the user mobile phone to use a service function other than the services set to a plurality of service buttons, to the user mobile phone, and may enable the user to use a service function other than the services set to the plurality of service buttons using the service application installed according to the guidance message.

In addition, the service request application may further execute:

a removal prevention function of periodically detecting signal intensity of wireless communication and transmitting the detected signal intensity value to the monitoring system 200.

Figure 4:
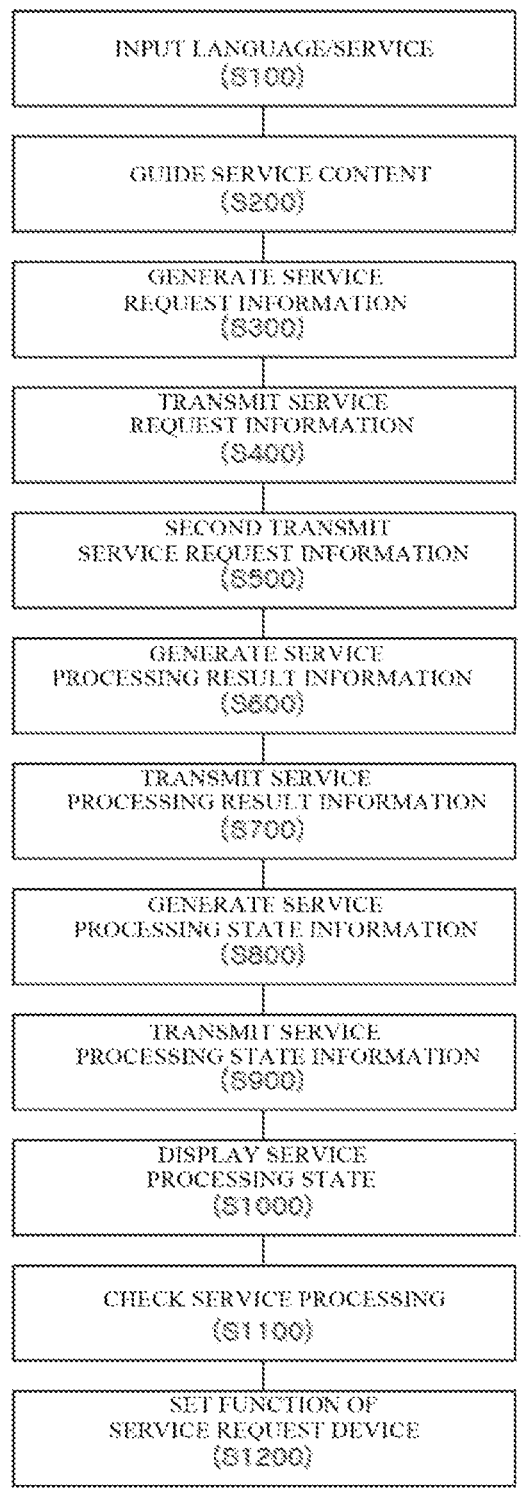
FIG. 4 is a block diagram of a service request method using a service request device for a multiple language supported room according to the present invention.

As shown in FIG. 4, a service request method for a multiple language supported room according to the present invention may include:

performing language/service input (S100) of receiving selection of a language and service that is desired by a user, through the service request device 100;

performing service content guidance (S200) of guiding language and service content input by the user, through the service request device 100;

performing service request information generation (S300) of generating service request information related to the service selected by the user, through the service request device 100;

performing first service request information transmission (S400) of transmitting service request information generated by the service request device 100 to the monitoring system 200;

performing second service request information transmission (S500) of determining an employee who is capable of processing the requested service related to the service request information and transmitting the service request information to the employee terminal 300 of the determined employee, through the monitoring system 200;

performing service processing result information generation (S600) of generating service processing result information indicating a processing result of a service related to the service request information, through the employee terminal 300;

performing service processing result information transmission (S700) of transmitting the generated service processing result information to the monitoring system 200, through the employee terminal 300;

performing service processing state information generation (S800) of generating service processing state information using the service processing result information, through the monitoring system 200;

performing service processing state information transmission (S900) of transmitting the service processing state information to the service request device 100, through the monitoring system 200; and performing service processing state display (S1000) of displaying a processing state of the service requested by the user using a display unit based on service processing state information, through the service request device 100.

The performing of the language/service input (S100) may include selecting a language desired by the user through the language selection unit 110 and selecting a service button desired by the user among service buttons formed on the service button unit 130, using the service request device 100.

The performing of the service content guidance (S200) may include notifying the user about service content selected by the user in the language selected by the user and the service content may be indicated via voice or text.

For example, when the language selected by the language selection unit 110 is English, if a cleaning service button is pushed through the service button unit 130, English announcement "You have selected a cleaning service." may be audibly output.

Voice content indicated to the user in the notifying of the user about the service content may be provided through the speaker unit 150 formed on the service request device 100.

In addition, when the service content is indicated via text, the language selected by the language selection unit 110 is English and a cleaning service button is pushed through the service button unit 130, English text "You have selected the cleaning service." may be provided through the display unit 120.

The performing of the service request information generation (S300) may include generating service request information as information on the service selected and requested through the service button unit 130, through the service request device 100 and, in this case, the service request information may include user selection language information, requested service information, room number information, request time information, unique information of the service request device 100, and the like.

The service request information may be generated as information, for example, "English_Cleaning Services_No. 1001_09:10_1001A" and may be transmitted to the monitoring system 200.

The performing of the first service request information transmission (S400) may include transmitting the service request information generated by the service request device 100 to the monitoring system 200 using wireless network communication.

For wireless network communication, any one of communication methods of a wireless network such as CDMA and LTE or short-range communication such as Wi-Fi and Bluetooth may be selected and used.

The performing of the second service request information transmission (S500) may include determining the employee who is capable of processing the service related to the service request information received from the service request device 100 and transmitting the service request information to the employee terminal 300 of the determined employee, through the monitoring system 200.

The performing of the service processing result information generation (S600) may include generating service processing result information indicating a processing result of a service related to the service request information through the employee terminal 300 and, in this case, the service processing result information may be information indicating any one of processing scheduled or processing completed with respect to the requested service.

The performing of the service processing result information transmission (S700) may include transmitting the generated service processing result information to the monitoring system 200 using wireless network communication, through the employee terminal 300.

The performing of the service processing state information generation (S800) may include generating service processing state information through the monitoring system 200 using the service processing result information transmitted from the employee terminal 300 and, in this case, the service processing result information transmitted from the employee terminal 300 indicates that processing is scheduled, service processing state information indicating that processing is scheduled may be generated and, when the service processing result information indicates that processing is completed, service processing state information indicating that processing is completed may be generated and may be transmitted to the service request device 100.

The service processing state information may be generated as information, for example, "Requested cleaning service_processing scheduled" or "Requested cleaning service_processing completed" and may be transmitted to the service request device 100.

The performing of the service processing state information transmission (S900) may include transmitting the service processing state information generated by the monitoring system 200 to the corresponding service request device 100 using wireless network communication.

The performing of the service processing state display (S1000) may include displaying service processing state information using at least one of a lighting method, an image display method, or a voice guidance method, through the service request device 100.

For the lighting method, the service request device 100 may turn on the lighting unit 165 with different colors depending on the service processing state information through the lighting unit 165 that is capable of emitting light of different colors.

For the image display method, the service request device 100 may display a processing state of a service as text in a language selected by a user based on the service processing state information of the requested service, through the display unit 120.

For the voice guidance method, the request result display 160 may audibly output a processing state of a requested service in a language selected by the user, through the speaker unit 150.

The service request method for a multiple language supported room according to the present invention may further include performing service processing checking (S1100) of transmitting a processing check message to a corresponding employee terminal 300 and, simultaneously, transmitting a service processing delay message to a manager when service processing result information is not received from the corresponding employee terminal 300 for a predetermined time period after the service request information is transmitted to the employee terminal 300 or service processing result information indicating that processing is completed is not received from the corresponding employee terminal 300 for a predetermined time period after service processing result information indicating that processing is scheduled is received from the employee terminal 300 through the second service request information transmission.

The performing of the service processing checking (S1100) may include transmitting a processing check message to the corresponding employee terminal 300 and, simultaneously, transmitting a service delay message of the corresponding employee to a manager terminal that manages the service request system according to the present invention when service processing result information is not received by the monitoring system 200 from the employee terminal 300 in response to service request information transmitted to the employee terminal 300.

For example, if the service processing result information is not received, the request information processor 220 may transmit a message "English_Cleaning Services_No.

1001_09:10_1001A To check processing of requested service" to the employee terminal 300 and, when service processing result information is not transmitted as processing completed after a predetermined time period from selection of processing scheduled through the employee terminal 300, the request information processor 220 may transmit a message "Scheduled English_Cleaning Services_No. 1001_09:10_1001A To check service processing".

Even if a predetermined time period does not elapse in a processing scheduled state, when processing is not completed, a processing delay message may be transmitted to a manager terminal and the processing delay message transmitted to the manager terminal may be transmitted as a message "English_Cleaning Services_No. 1001_09:10_1001A To check scheduled serving processing delay state".

The service request method for a multiple language supported room according to the present invention may further include performing function setting (S1200) of adding/deleting an available language in the service request device 100, voice data, and text data, of setting/changing a function of a service button included in the service request device 100, and setting/changing a room number to be assigned to the service request device 100, through the function setting system 400.

The performing of the function setting (S1200) may include further adding other languages to language data stored in the service request device 100, deleting an unnecessary language, setting or changing a function of a service button formed on the service request device 100, and setting and changing room number information to correspond to the room when the service request device 100 is used in another room, through the function setting system 400

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

According to the present invention, a language to be used by a user may be selected and a service may be used through a service for supporting multiple languages to provide convenience of service usage and to reduce hotel operating costs, thereby enhancing industrial applicability.

What is claimed is:

1. A service request system for providing support for multiple languages to a hotel room, comprising:
a service request device installed in a room in the hotel and configured to, in response to a desired language and service being selected by a user and a request for a specific service being made by the user, notify the user about information on the selected service using the language selected by the user, said service being a service provided by the hotel to the hotel room at a request of the user, the service request device further configured to generate service request information corresponding to the service requested by the user, to transmit the generated service request information to a monitoring system, to receive service processing state information of the requested service from the monitoring system, and to display a processing result of the requested service through a request result display;
the monitoring system configured to transmit the service request information transmitted from the service request device to an employee terminal, and to generate the service processing state information of the requested service based on service processing result information indicating that processing of the requested service is scheduled or completed and to transmit the service processing state information to the service request device, in response to the service processing result information being received from a specific employee terminal; and
a plurality of employee terminals each corresponding to employees of the hotel, the plurality of employee terminals configured to receive the service request information from the monitoring system and comprising an application installed therein to perform a function of generating service processing result information on a service request corresponding to the received service request information and transmitting the service processing result information to the monitoring system,
wherein the monitoring system is configured to analyze the service request information and determine the employee terminal, from among the plurality of employee terminals, capable of processing the request, and
wherein the service request device further comprises a user mobile phone identification unit configured to receive user mobile phone identification information via a user mobile phone and short-range communication and to determine the desired language by extracting language information of the user from the received user mobile phone identification information.

2. The service request system according to claim 1, further comprising a function setting system,
wherein the function setting system adds/deletes an available language in the service request device, voice data for each language, and text data for each language, sets/changes a function of a service button included in the service request device, and sets/changes a room number to be assigned to the service request device; and
wherein the function setting system comprises a multiple language voice data DB configured to store the voice data for each language for a plurality of services to be supportable for a user.

3. The service request system according to claim 1, wherein the service request device comprises:
a language selection unit formed to enable the user to select the desired language;
a service button unit comprising a plurality of service buttons with a specific service being set for each button;
a button selection controller configured to determine whether any one of the service buttons included in the service button unit is selected by the user for a predetermined time period or according to a predetermined rule and configured to generate button selection information and to transmit the button selection information to a voice output controller upon determining that the predetermined time or the predetermined rule is satisfied;
the voice output controller configured to determine that a specific service button of the service button unit is selected by the user upon receiving the button selection information from the button selection controller, configured to identify the selected service button using the button selection information, configured to extract voice data in the language selected through the language selection unit among voice data corresponding to service content set to the selected service button, from a voice data memory, and configured to control a speaker unit to output the voice data;

the speaker unit configured to output the voice data extracted by the voice output controller under control of the voice output controller;

the request result display configured to display service processing state information indicating a current processing situation of the service requested by the user;

a request information generation unit configured to generate service request information indicating information on the service that is selected and requested by the user through the service button unit;

the voice data memory configured to store voice data for each language corresponding to the service content set for each of the plurality of service buttons included in the service button unit; and a communication unit connected to the monitoring system via wireless network communication and configured to transmit service request information to the monitoring system or to receive processing state information from the monitoring system.

4. The service request system according to claim 3, wherein the language selection unit enables the user to select the desired language and uses any one of a button method, a touchscreen method, and a jog wheel method.

5. The service request system according to claim 3, wherein the request result display notifies the user about a current processing situation of the service requested by the user and notifies the user about a processing state of the requested service using at least one of a lighting method, an image display method, or a voice guidance method;

wherein, for the lighting method, the request result display comprises a lighting unit that is capable of emitting light of different colors and turns on the lighting unit with different colors depending on a processing state of the requested service;

wherein, for the image display method, the request result display displays a processing state of the requested service as text in a language selected by the user through a display unit; and wherein, for the voice guidance method, the request result display audibly outputs the processing state of the requested service in the language selected by the user through the speaker unit.

6. The service request system according to claim 3, wherein the request information generation unit generates service request information comprising user selection language information, requested service information selected by the user, room number information, request time information, and unique information of the service request device.

7. The service request system according to claim 1, wherein the monitoring system comprises:

an information receiver configured to receive service request information transmitted from the service request device and service processing result information transmitted from the employee terminal;

a request information processor configured to recognize the service request information transmitted from the service request device, configured to determine an employee who is capable of processing a service, and configured to control an information transmitter to transmit the service request information to the employee terminal of the determined employee;

a processing state information generation unit configured to generate service processing state information of the service requested by the user using the service processing result information transmitted from the employee terminal and configured to control the information transmitter to transmit the generated service processing state information to the service request device; and the information transmitter configured to transmit the service request information to the employee terminal under control of the request information processor and configured to transmit the service processing state information to the service request device under control of the processing state information generation unit.

8. The service request system according to claim 1, wherein the application installed in the employee terminal performs a function of receiving the service request information provided from the monitoring system, a function of displaying information included in the service request information on a screen of the employee terminal, a function of asking an employee whether a requested service is processed, a function of generating service processing result information based on an answer of the employee with respect to the asking, and a function of transmitting the generated service processing result information to the monitoring system.

9. The service request system according to claim 7, wherein, when service processing result information is not received from the corresponding employee terminal for a predetermined time period after the request information processor transmits the service request information to the employee terminal or service processing result information of processing completed is not received from the corresponding employee terminal for a predetermined time period after service processing result information indicating processing scheduled is received from the employee terminal, the request information processor transmits a processing check message to a corresponding employee terminal and, simultaneously, transmits a service processing delay message to a manager terminal.

10. The service request system according to claim 3, wherein the service request device further comprises:

the display unit configured to display text data that is extracted under control of a text output controller;

the text output controller configured to receive button selection information from the button selection controller, to determine that a specific service button of the service button unit is selected by a user upon receiving the button selection information, to identify the selected service button using the button selection information, to extract text data of a language selected through the language selection unit among text data corresponding to service content set to the selected service button, from a text data memory, and to control the display unit to display the text data; and the text data memory configured to store text data for each language corresponding to service contents set for a plurality of respective service buttons included in the service button unit.

11. The service request system according to claim 3, wherein the monitoring system further comprises:

a user identification processor configured to match the user mobile phone identification information and language information transmitted from the user mobile phone identification unit and to store the matched information in a user information DB, to recognize whether the same identification information as the user mobile phone identification information transmitted from the user mobile phone identification unit is stored in the user information DB, and to transmit the language information matched with the corresponding user mobile phone identification information to the user mobile phone identification unit when the same identification information is stored in the user information DB, wherein the user information DB is configured to match and store the user mobile phone identification information and language information transmitted from the user mobile phone identification unit, and wherein the user mobile phone identification unit controls the language selection unit to select a language corresponding to the received language information without language selection of a user through the language selection unit upon receiving the language information from the user identification processor.

12. The service request system according to claim 3, wherein the service button unit further comprises an additional service button, and wherein, when the additional service button is selected by the user, the user mobile phone identification unit transmits a guidance message for installation of a service application in a user mobile phone to the user mobile phone to use a service function other than the services set to the service button unit and enables the user to use the service function other than the service set to the service button unit using the service application installed according to the guidance message.

13. The service request system according to claim 3, wherein the service request device further comprises a removal prevention unit configured to periodically detect signal intensity of wireless communication and to transmit the detected signal intensity value to the monitoring system, wherein the monitoring system further comprises a removal determination unit configured to continuously and accumulatively store signal intensity values transmitted from the removal prevention unit, to calculate and store an average value of the accumulatively stored signal intensity values while accumulatively storing the signaling intensity values, and to determine that the service request device is removed from a room when the signal intensity value transmitted from the removal prevention unit is lower than the average value by a setting value or more, and wherein, upon determining that the service request device is removed from the room, the removal determination unit transmits a notification message indicating that the service request device has been removed, to a manager terminal.

14. A service request system for providing support for multiple languages to a hotel room, comprising:

a language selection unit configured to enable a user to select a desired language;

a service button unit comprising a plurality of service buttons with a specific service being set for each button, each service being a service provided by the hotel to the hotel room at a request of the user;

a button selection controller configured to determine whether any one of the service buttons included in the service button unit is selected by the user for a predetermined time period or according to a predetermined rule and configured to generate button selection information and to transmit the button selection information to a voice output controller upon determining that the predetermined time or the predetermined rule is satisfied;

the voice output controller configured to determine that a specific service button of the service button unit is selected by the user upon receiving the button selection information from the button selection controller, configured to identify the selected service button using the button selection information, configured to extract voice data in the language selected through the language selection unit among voice data corresponding to service content set to the selected service button, from a voice data memory, and configured to control a speaker unit to output the voice data;

the speaker unit configured to output the voice data extracted by the voice output controller under control of the voice output controller;

a request result display configured to display service processing state information indicating a current processing situation of the service requested by the user;

a request information generation unit configured to generate service request information indicating information on the service that is selected and requested by the user through the service button unit;

the voice data memory configured to store voice data for each language corresponding to the service content set for each of the plurality of service buttons included in the service button unit;

a communication unit connected to a monitoring system via wireless network communication and configured to transmit service request information to the monitoring system or to receive processing state information from the monitoring system; and a user mobile phone identification unit configured to receive user mobile phone identification information via a user mobile phone and short-range communication and to determine the desired language by extracting language information of the user from the received user mobile phone identification information.

15. The service request system according to claim 14, wherein the language selection unit enables the user to select the desired language and uses any one of a button method, a touchscreen method, and a jog wheel method.

16. The service request system according to claim 14, wherein the request result display notifies the user about a current processing situation of the service requested by the user and notifies the user about a processing state of the requested service using at least one of a lighting method, an image display method, or a voice guidance method, wherein, for the lighting method, the request result display comprises a lighting unit that is capable of emitting light of different colors and turns on the lighting unit with different colors depending on a processing state of the requested service, wherein, for the image display method, the request result display displays a processing state of the requested service as text in a language selected by the user through a display unit, and wherein, for the voice guidance method, the request result display audibly outputs the processing state of the requested service in the language selected by the user through the speaker unit.

17. The service request system according to claim 14, wherein the service request information generated by the request information generation unit comprises user selection language information, requested service information selected by the user, room number information, request time information, and unique information of the service request device.

18. The service request system according to claim 14, wherein the service request system adds/deletes an available language in the service request device, voice data for each language, and text data for each language, sets/changes a function of a service button included in the service request device, and sets/changes a room number to be assigned to the service request device, through an external function setting system.

19. The service request system according to claim 14, wherein the service request device further comprises:
the display unit configured to display text data that is extracted under control of a text output controller;
the text output controller configured to receive button selection information from the button selection controller, to determine that a specific service button of the service button unit is selected by a user upon receiving the button selection information, to identify the selected service button using the button selection information, to extract text data of a language selected through the language selection unit among text data corresponding to service content set to the selected service button, from a text data memory, and to control the display unit to display the text data; and
the text data memory configured to store text data for each language corresponding to service contents set for a plurality of respective service buttons included in the service button unit.

20. The service request system according to claim 14, wherein the user mobile phone identification unit transmits the user mobile phone identification information and the language information to the monitoring system, and
wherein the user mobile phone identification unit controls the language selection unit to select a language corresponding to the received language information without language selection of the user through the language selection unit upon receiving the language information from the monitoring system.

21. The service request system according to claim 20, wherein the service button unit further comprises an additional service button, and
wherein, when the additional service button is selected by the user, the user mobile phone identification unit transmits a guidance message for installation of a service application in a user mobile phone to the user mobile phone to use a service function other than the services set to the service button unit and enables the user to use the service function other than the service set to the service button unit using the service application installed according to the guidance message.

22. The service request system according to claim 14, wherein the service request device further comprises a removal prevention unit, and
wherein the removal prevention unit periodically detects signal intensity of wireless communication and transmits the detected signal intensity value to the monitoring system.

23. A service request method for providing support for multiple languages to a user in a hotel room, the method comprising:
performing language/service input of receiving selection of a language and service that is desired by a user, through a service request device, the service being a service provided by the hotel to the hotel room at a request of the user;
performing service content guidance of guiding language and service content input by the user, through the service request device;
performing service request information generation of generating service request information related to the service selected by the user, through the service request device;
performing first service request information transmission of transmitting service request information generated by the service request device to the monitoring system;
performing second service request information transmission of determining an employee of the hotel who is capable of processing the requested service related to the service request information and transmitting the service request information to an employee terminal of the determined employee, through the monitoring system;
performing service processing result information generation of generating service processing result information indicating a processing result of a service related to the service request information, through the employee terminal;
performing service processing result information transmission of transmitting the generated service processing result information to the monitoring system, through the employee terminal;
performing service processing state information generation of generating service processing state information using the service processing result information, through the monitoring system;
performing service processing state information transmission of transmitting the service processing state information to the service request device, through the monitoring system;
performing service processing state display of displaying a processing state of the service requested by the user using a display unit based on service processing state information, through the service request device; and
receiving user mobile phone identification information via a user mobile phone and short-range communication, and determining the language desired by the user by extracting user language information from the received user mobile phone identification information.

24. The method according to claim 23, further comprising performing service processing checking of transmitting a processing check message to a corresponding employee terminal and, simultaneously, transmitting a service processing delay message to a manager when service processing result information is not received from the corresponding employee terminal for a predetermined time period after the service request information is transmitted to the employee terminal or service processing result information indicating that processing is completed is not received from the corresponding employee terminal for a predetermined time period after service processing result information indicating that processing is scheduled is received from the employee terminal through the second service request information transmission.

25. The method according to claim 23, further comprising performing function setting of adding/deleting an available language in the service request device, voice data, and text data, of setting/changing a function of a service button included in the service request device, and setting/changing a room number to be assigned to the service request device, through the function setting system.

26. The method according to claim 23, wherein the service request information comprises at least one of user selection language information, requested service information selected by the user, room number information, or request time information, unique information of the service request device.

27. A service request system for providing support for multiple languages to a user in a hotel room, comprising a service request application installed therein to execute a service request,
wherein the service request application executes:
a language selection function for allowing a user to select a desired language;
a service button setting function for setting specific services to a plurality of respective service buttons embodied as images, each of the services being a service provided by the hotel to the hotel room at a request of the user;
a button selection control function of determining whether any one of the embodied service buttons is selected by the user for a predetermined time period or according to a predetermined rule and generating button selection information upon determining that the predetermined time or the predetermined rule is satisfied;
a voice output control function of determining that a specific service button is selected by the user when the button selection information is generated, identifying the selected service button using the button selection information, and controlling a speaker to output voice data in the language selected by the user among voice data corresponding to the service content set to the selected service button;
a request result display function of displaying service processing state information indicating a current processing situation of the service requested by the user;
a request information generating function of generating service request information on the service that is selected by the user through a service button;
a voice data memory function of storing voice data for each language corresponding to service contents set to the plurality of respective service buttons;
a communication function of transmitting service request information to a monitoring system or receiving processing state information from the monitoring system; and
a user mobile phone identification function of receiving user mobile phone identification information via a user mobile phone and short-range communication, and determining the desired language by extracting user language information from the received user mobile phone identification information,
wherein the service request device is a portable mobile electronic device.

28. The service request system according to claim 27, wherein the request result display function notifies a user about a current processing state of a requested service with respect to a service requested by the user and the processing state of the requested service is indicated to the user using at least one of a lighting method, an image display method, or a voice guidance method,
wherein, for the lighting method, the request result display function turns on a lighting unit that is capable of emitting light of different colors to emit light of different colors depending on a processing state of the requested service through the lighting unit,
wherein, for the image display method, the request result display function displays a processing state of the requested service as text in a language selected by the user through a display unit, and
wherein, for the voice guidance method, the request result display function audibly outputs the processing state of the requested service in the language selected by the user through a speaker.

29. The service request system according to claim 27, wherein the service request information comprises user selection language information, requested service information selected by the user, room number information, request time information, and unique information of a service request device.

30. The service request system according to claim 27, wherein the service request application further execute:
a function of adding/deleting an available language in the service request device, voice data for each language, and text data for each language, a function of setting/changing a function of a service button embodied as an image, and a function of setting/changing a room number to be assigned to the service request device, through an external function setting system.

31. The service request system according to claim 27, wherein the service request application further executes:
a text output control function of determining that a specific service button is selected by a user when button selection information is generated, identifying the selected service button using the button selection information, and controlling a display unit to display text data of a language selected by the user among text data corresponding to the service content set to the selected service button; and
a text data memory function of storing text data for each language corresponding to service contents set to the plurality of respective service buttons.

32. The service request system according to claim 27, wherein the user mobile phone identification function includes transmitting the user mobile phone identification information and the language information to the monitoring system, and selecting a language corresponding to the received language information without language selection of the user upon receiving the language information from the monitoring system.

33. The service request system according to claim 32, wherein, when the additional service button is further embodied as an image in addition to a plurality of service buttons embodied as images and the additional service button is selected by a user, the service request application executes a function of transmitting a guidance message for installation of a service application in a user mobile phone to the user mobile phone to use a service function other than the services set to a plurality of service buttons, to the user mobile phone, and enables the user to use a service function other than the services set to the plurality of service buttons using the service application installed according to the guidance message.

34. The service request system according to claim 27, wherein the service request application further executes a removal prevention function of periodically detecting signal intensity of wireless communication and transmitting the detected signal intensity value to the monitoring system.

* * * * *